United States Patent
Platzer, Jr.

(10) Patent No.: US 7,448,764 B2
(45) Date of Patent: Nov. 11, 2008

(54) COMPOUND AUTOMOTIVE REARVIEW MIRROR

(76) Inventor: George E. Platzer, Jr., 424 Cypress Rd., Rochester Hills, MI (US) 48309

( * ) Notice: Subject to any disclaimer, the term of this patent is extended or adjusted under 35 U.S.C. 154(b) by 0 days.

(21) Appl. No.: 11/502,214

(22) Filed: Aug. 10, 2006

(65) Prior Publication Data

US 2006/0268440 A1      Nov. 30, 2006

Related U.S. Application Data

(62) Division of application No. 10/784,668, filed on Feb. 23, 2004, now Pat. No. 7,097,312.

(60) Provisional application No. 60/449,370, filed on Feb. 21, 2003.

(51) Int. Cl.
*G02B 5/10* (2006.01)
(52) U.S. Cl. ........................................... 359/864
(58) Field of Classification Search ................... 359/850, 359/858, 864, 865, 866, 868, 838, 844
See application file for complete search history.

(56) References Cited

U.S. PATENT DOCUMENTS

| | | | |
|---|---|---|---|
| 1,114,559 A | 10/1914 | Weed | |
| 1,672,559 A | 6/1928 | Doble | |
| RE17,274 E | 4/1929 | Porter | |
| 2,135,262 A | 11/1938 | Schumacher | |
| 2,514,989 A | 7/1950 | Buren | |
| 2,636,419 A | 4/1953 | Kerr | |
| 2,778,273 A | 1/1957 | Fellmeth | |
| 2,911,177 A | 11/1959 | West | |
| 3,131,250 A | 4/1964 | Ely | |
| 3,146,296 A | 8/1964 | Fischer | |
| 3,170,985 A | 2/1965 | Katulich | |
| 3,175,463 A | 3/1965 | Seashore | |
| 3,267,806 A | 8/1966 | Azegami | |
| 3,337,285 A | 8/1967 | Travis | |

(Continued)

FOREIGN PATENT DOCUMENTS

DE     25 50 095 A1     5/1976

(Continued)

OTHER PUBLICATIONS

George Platzer, The Geometry of Automotive Rearview Mirrors—Why Blind Zones Eixst and Strategies to Overcome Them. The Engineering Society for Advancing Mobility Land Sear Air and Space International. SAE Technical Paper Series 950601.

*Primary Examiner*—Alessandro Amari
(74) *Attorney, Agent, or Firm*—Brooks Kushman P.C.

(57) ABSTRACT

A composite mirror adapted for use as an outside rearview mirror of a motor vehicle includes a main or primary viewing mirror and an auxiliary blindzone viewing mirror juxtaposed to expose the vehicle blindzone to the vehicle operator. The main viewing mirror is generally of unit magnification. The auxiliary mirror is generally composed of a convex surface that can be either attached atop the surface of the main viewing mirror or placed within a cut-out region of the main viewing mirror. The auxiliary mirror can be partially recessed below the surface of the main viewing mirror and can have a skirt for minimizing undesirable reflections in the main viewing mirror.

10 Claims, 10 Drawing Sheets

U.S. PATENT DOCUMENTS

| | | | |
|---|---|---|---|
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer, Jr. |
| 3,610,739 A | 10/1971 | Seashore |
| 3,667,833 A | 6/1972 | Baldwin, Sr. |
| 3,708,222 A | 1/1973 | Stern |
| 3,764,201 A | 10/1973 | Haile |
| 3,806,232 A | 4/1974 | Gray |
| 3,826,563 A | 7/1974 | Davis |
| 3,881,811 A | 5/1975 | French |
| 3,909,117 A | 9/1975 | Takahashi et al. |
| 4,200,359 A | 4/1980 | Lawson |
| 4,223,983 A | 9/1980 | Bloom |
| 4,264,144 A | 4/1981 | McCord |
| 4,268,120 A | 5/1981 | Jitsumori |
| 4,293,191 A | 10/1981 | Kim |
| 4,303,308 A | 12/1981 | Kobrin |
| 4,306,770 A | 12/1981 | Marhauer |
| 4,311,363 A | 1/1982 | Marsalka et al. |
| 4,325,609 A | 4/1982 | Alford |
| 4,350,412 A | 9/1982 | Steenblik et al. |
| 4,436,372 A | 3/1984 | Schmidt et al. |
| 4,439,013 A | 3/1984 | Hagn et al. |
| 4,470,665 A | 9/1984 | Blom |
| 4,526,446 A | 7/1985 | Adams |
| 4,549,786 A | 10/1985 | Albers et al. |
| 4,575,202 A | 3/1986 | McGuire |
| 4,609,266 A | 9/1986 | Blom |
| 4,629,296 A | 12/1986 | White |
| 4,674,849 A | 6/1987 | Stewart |
| 4,674,850 A | 6/1987 | Blom |
| 4,715,701 A | 12/1987 | Urban |
| 4,733,336 A | 3/1988 | Skogler et al. |
| D297,926 S | 10/1988 | Kesler |
| 4,824,231 A | 4/1989 | Quintana |
| 4,828,379 A | 5/1989 | Parsons et al. |
| 4,859,046 A | 8/1989 | Traynor et al. |
| 4,906,075 A | 3/1990 | Majsumiya |
| 4,913,542 A | 4/1990 | Adolfsson |
| 4,917,485 A | 4/1990 | Baldwin, Sr. |
| 4,929,074 A | 5/1990 | Urban |
| 4,932,770 A | 6/1990 | Caravaty |
| 4,989,964 A | 2/1991 | Meise |
| 5,005,962 A | 4/1991 | Edelman |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,080,492 A | 1/1992 | Platzer, Jr. |
| 5,115,352 A | 5/1992 | do Espirito Santo |
| 5,166,833 A | 11/1992 | Shyu |
| 5,237,458 A | 8/1993 | Polanyi et al. |
| 5,237,459 A | 8/1993 | Strauss |
| 5,295,021 A | 3/1994 | Swanson |
| 5,296,973 A | 3/1994 | Burke |
| 5,424,875 A | 6/1995 | Davis, II |
| 5,432,643 A | 7/1995 | Huang |
| 5,517,367 A | 5/1996 | Kim et al. |
| 5,526,195 A | 6/1996 | Thomas |
| 5,557,467 A | 9/1996 | McColgan et al. |
| 5,559,640 A | 9/1996 | Vachss et al. |
| 5,563,744 A | 10/1996 | Matsumiya |
| 5,579,133 A | 11/1996 | Black et al. |
| 5,594,593 A | 1/1997 | Milner |
| 5,621,569 A | 4/1997 | Schlenke |
| 5,644,442 A | 7/1997 | Lemere |
| 5,691,855 A | 11/1997 | Lupkas |
| 5,784,211 A | 7/1998 | Mingledorff |
| 5,790,327 A | 8/1998 | Lee et al. |
| 5,793,542 A | 8/1998 | Kondo et al. |
| 5,796,532 A | 8/1998 | Kanazana |
| 5,805,367 A | 9/1998 | Kanazawa |
| 5,835,294 A | 11/1998 | Minegishi |
| 5,838,505 A | 11/1998 | Palathingal |
| 5,847,889 A | 12/1998 | Komiyama et al. |
| 5,864,434 A * | 1/1999 | Taylor ........................ 359/883 |
| 5,980,050 A | 11/1999 | McCord |
| 6,007,207 A | 12/1999 | Liu |
| 6,030,084 A | 2/2000 | Schmidt |
| 6,033,078 A | 3/2000 | Su et al. |
| 6,074,068 A | 6/2000 | Palathingal |
| 6,109,586 A * | 8/2000 | Hoek ........................ 248/476 |
| 6,116,743 A | 9/2000 | Hoek |
| 6,199,993 B1 | 3/2001 | Mou |
| 6,270,225 B1 | 8/2001 | Goolsby |
| 6,315,419 B1 | 11/2001 | Platzer, Jr. |
| 6,390,632 B1 | 5/2002 | Palathingal |
| 6,522,451 B1 | 2/2003 | Lynam |
| 6,919,796 B2 | 7/2005 | Boddy et al. |

FOREIGN PATENT DOCUMENTS

| | | |
|---|---|---|
| EP | 0 210 757 A2 | 2/1987 |
| EP | 0 551 802 A1 | 7/1993 |
| EP | 0 791 503 A2 | 8/1997 |

* cited by examiner

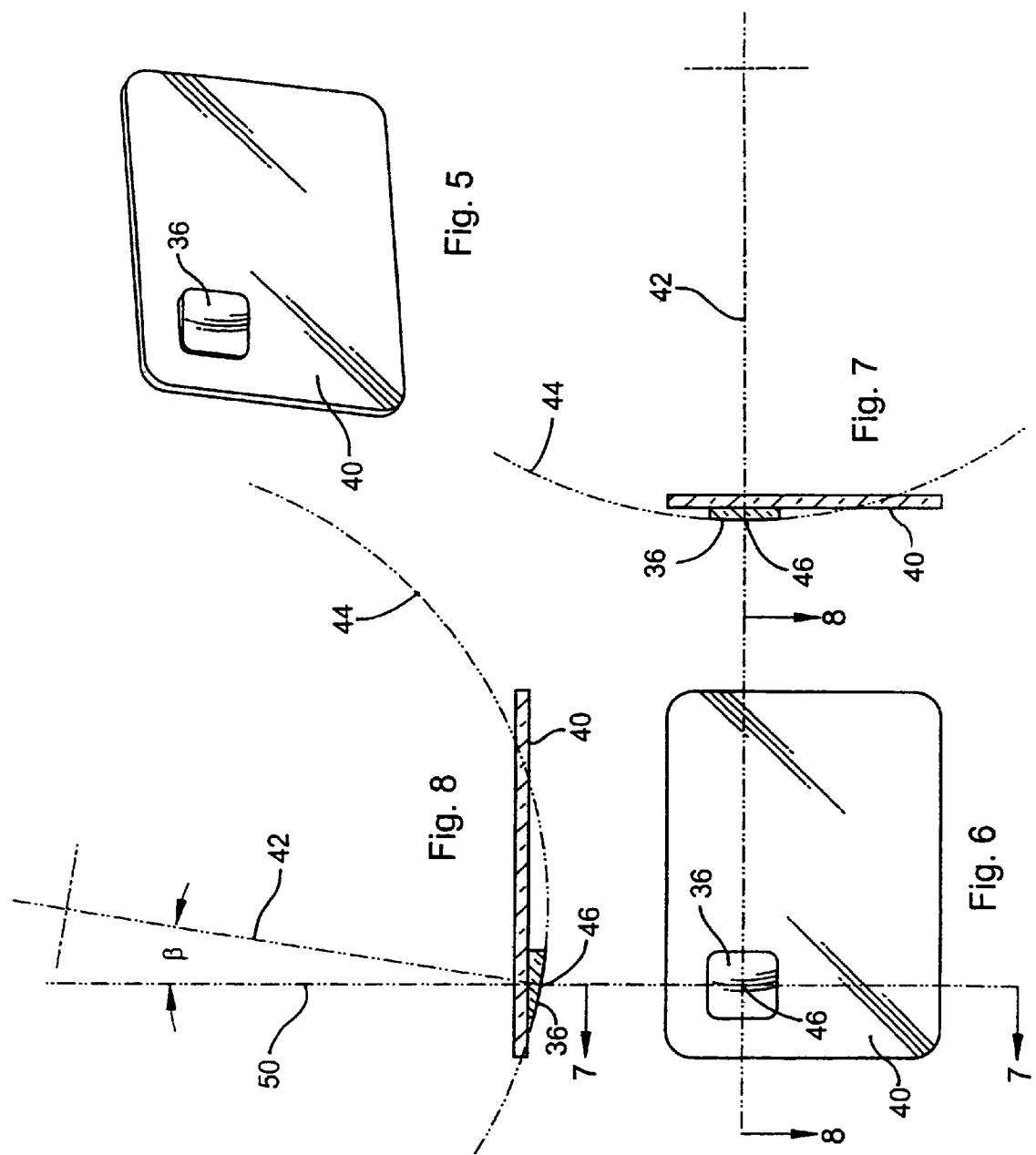

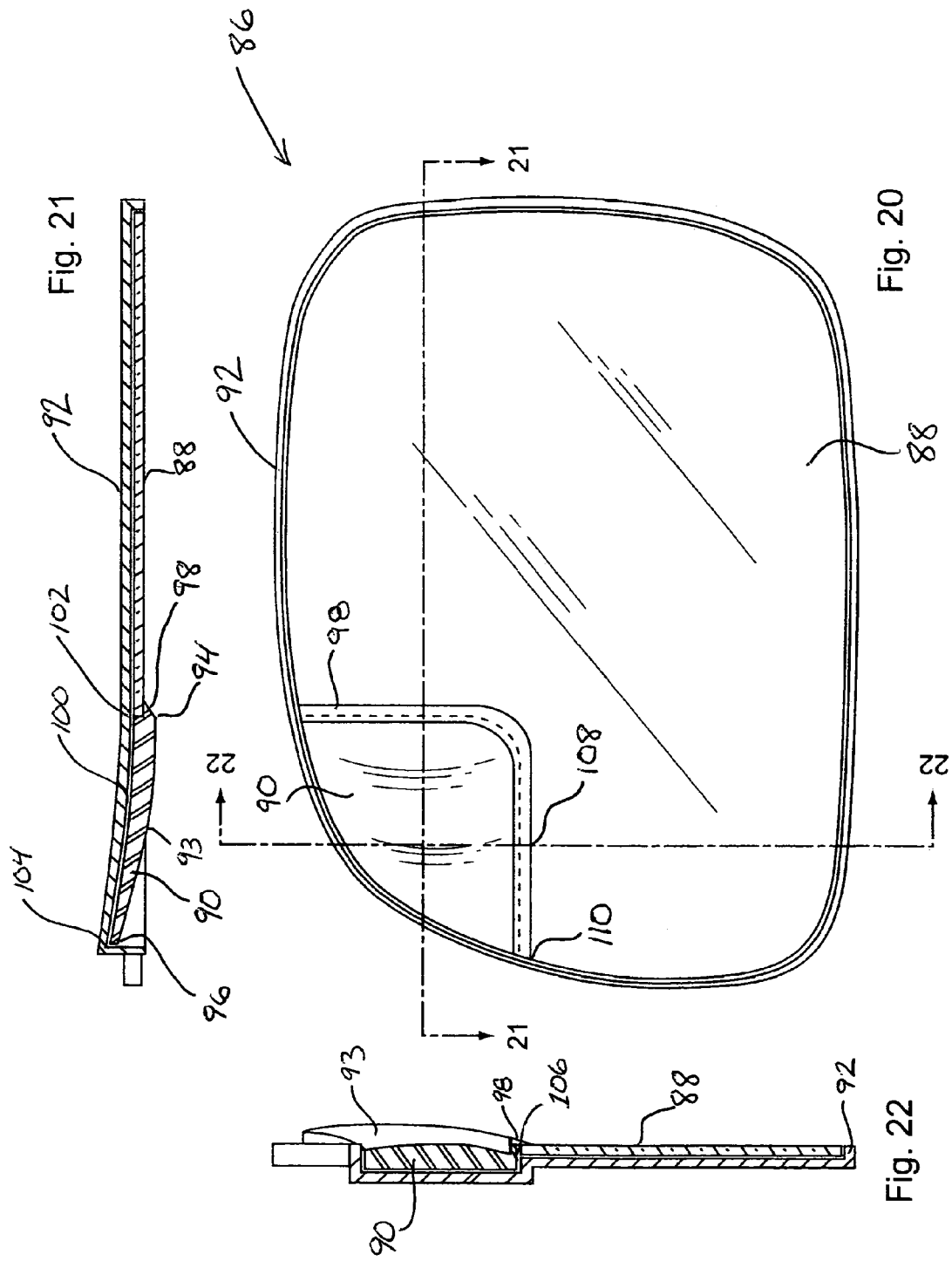

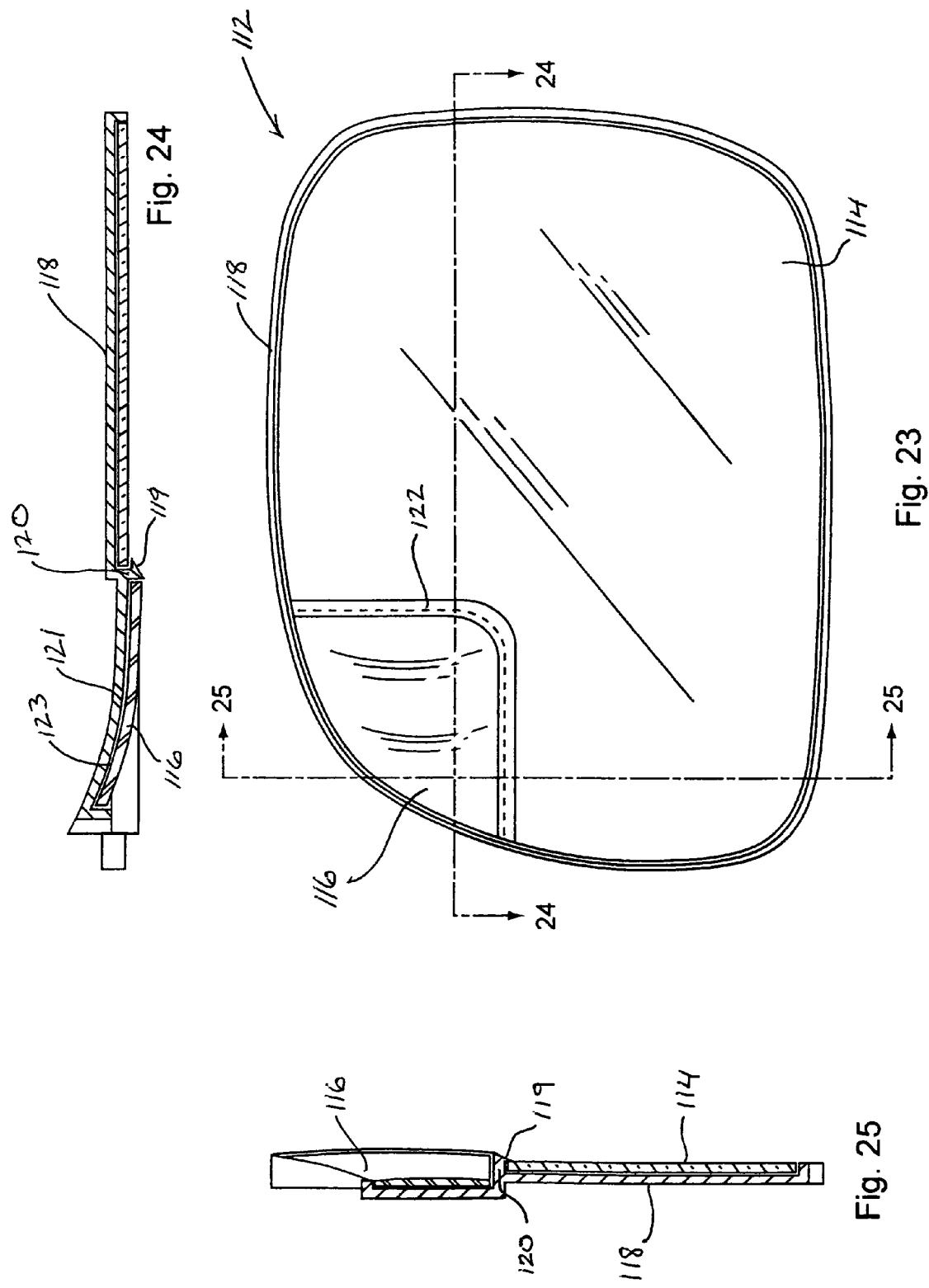

COMPOUND AUTOMOTIVE REARVIEW MIRROR

This application is a divisional of application Ser. No. 10/784,668, filed on Feb. 23, 2004 now U.S. Pat. No. 7,097,312, which claims the benefit of U.S. provisional application Ser. No. 60/449,370, filed Feb. 21, 2003.

BACKGROUND OF THE INVENTION

1. Field of the Invention

The present invention relates generally to mirrors having multiple surfaces of differing magnification and, particularly, to the application of such mirrors as external side rearview automotive operator aides.

2. Background Art

Originally, motor vehicles, particularly passenger cars, did not have mirrors to assist the driver. Early in this century however, both inside and outside mirrors were added to automotive vehicles to provide rearward and limited lateral visibility. As the number of vehicles and driving speeds increased, rearward visibility became ever more important.

Today, all passenger cars have a mirror centrally located inside the vehicle. This mirror is the primary mirror. It provides a wide viewing angle, giving an excellent view to the adjacent lanes at a distance of two or more car lengths to the rear. However, it is deficient in that it is unable to view the adjacent lanes at distances of less than one to two car lengths to the rear. In an effort to eliminate this deficiency and to provide rearward visibility when the rear window is blocked, outside mirrors were added to vehicles.

Presently, passenger cars are required by law to have a unit magnification outside rearview mirror on the driver's side. A unit magnification mirror is a plane mirror which produces the same size image on the retina as that which would be produced if the object were viewed directly from the same distance. Furthermore, as provided in Federal Motor Vehicle Safety Standard 111 (FMVSS 111), "The mirror shall provide the driver a field of view of a level road surface extending to the horizon from a line perpendicular to a longitudinal plane tangent to the driver's side of the vehicle at the widest point, extending 8 feet out from the tangent plane 35 feet behind the driver's eyes, with the seat in the rear most position." FMVSS 111 thus effectively determines the size of the mirror, which a manufacturer must provide. The size will vary among different manufacturer's vehicles because of the placement of the mirror on the vehicle with regard to the driver's seat location.

Unfortunately, outside mirrors meeting FMVSS 111 still do not provide adequate adjacent lane visibility to view cars that are in the range of one car length to the rear. That is, a blindzone exists where a vehicle is not visible in either the inside mirror or the outside mirror. Even a glance over the shoulder may not be adequate to observe a vehicle in the blindzone. For many vehicles, the door pillar between the front and rear doors obscures the view to the blindzone. Furthermore, this obstruction is not obvious to most drivers, and they may assume that the "over the shoulder glance" has allowed them to see the blindzone when in reality it has not.

Rearward vision in automobiles is mathematically described in a paper published by the Society of Automotive Engineers (SAE) in 1995. That paper is designated as SAE Technical Paper 950601. It is entitled, *The Geometry of Automotive Rearview Mirrors-Why Blindzones Exist and Strategies to Overcome Them*, by George Platzer, the inventor of the present invention. That paper is hereby incorporated by reference.

A common method of overcoming the blindzone is to add a spherically convex blindzone-viewing mirror to the required plane main mirror. Spherically convex mirrors provide a wide field of view, but at the penalty of a reduced image size. However, this may be acceptable if the mirror is only used to indicate the presence of a vehicle in the blindzone and it is not used to judge the distance or approach speed of vehicles to the rear. Simply placing a round segment of a convex mirror on the main mirror surface, as is commonly done with stick-on convex mirrors, does not solve the problem. Doing so can provide a view to the rear which includes the blindzone, but it will also show much of the side of the car, the sky and the road surface, which are distracting and extraneous to the safe operation of the vehicle. What is required is a convex blindzone-viewing mirror that shows the driver primarily only the blindzone. In this way, if the driver sees a vehicle in the blindzone-viewing mirror, he knows it is unsafe to move into the adjacent lane. All extraneous and distracting information should be removed from the blindzone-viewing mirror. Furthermore, by eliminating the irrelevant portions of the bull's-eye mirror, the remaining portion can have a larger radius of curvature, thereby increasing the image size for the given amount of area that is to be allocated to the convex mirror.

Other problems with add-on mirrors are that they:

may interfere with the requirements of FMVSS 111;

may substantially decrease the plane main mirror viewing angle;

interfere with cleaning, especially when there is ice on it; and appear as an unsightly excrescence on the main mirror. A blindzone-viewing mirror that is provided by a car manufacturer must not appear to be an afterthought, but rather an integral part of the mirror.

SUMMARY OF THE INVENTION

One object of the present invention is to provide a unit magnification main mirror, which meets the requirements of FMVSS 111 and simultaneously provides a blindzone-viewing mirror having a magnification of less than unity that, in application, is able to show an automobile driver's side blindzone.

Another object of the invention is to provide a less than unit magnification mirror that meets the requirements of FMVSS 111 on the passenger's side and simultaneously provides a blindzone-viewing mirror having a magnification of less than unity that is able to show the driver the blindzone on the passenger's side.

Yet another object of the invention is to provide a mirror having a combination of two surfaces of different magnification that is not objectionable in appearance.

Still another object of the invention is to provide a mirror having a combination of two surfaces of different magnification that is inexpensive and easy to manufacture.

In an embodiment of the invention, an auxiliary blindzone viewing mirror having a less than unit magnification can be adhesively attached to a main viewing mirror. The auxiliary blindzone viewing mirror can be comprised of a discrete mirror body can be optimized in size and orientation to provide primarily only a view of the blindzone while leaving the region surrounding it available to meet the requirements of FMVSS 111. Moreover, the discrete mirror body can be comprised of a recessed ledge formed in a base of the auxiliary mirror for retaining adhesive while maintaining flush contact with the main viewing mirror. The auxiliary blindzone viewing mirror can be located in the upper and outer region of the main viewing mirror.

In another embodiment of the invention, an auxiliary blindzone viewing mirror can be inserted into a cut-out region of a main viewing mirror. The auxiliary blindzone viewing mirror can comprise a convex reflective surface optimized in size and orientation to provide primarily only a view of the blindzone while leaving the region surrounding it available to meet the requirements of FMVSS 111. The auxiliary blindzone viewing mirror having a rim about its perimeter for resting against a surface of the main viewing mirror. The rim can be canted to obscure the reflection of the auxiliary blindzone viewing mirror in the main viewing mirror.

In still another embodiment of the present invention, an automotive outside rearview mirror comprising a main viewing mirror having a generally planar reflective surface, an auxiliary blindzone viewing mirror having a generally convex reflective surface, and a case for retaining both mirrors is provided. The auxiliary blindzone viewing mirror is shaped and positioned for viewing primarily only a driver's blindzone. The automotive outside rearview mirror further comprises a lip along the border between the main viewing mirror and the auxiliary blindzone viewing mirror. The lip comprises a canted surface for obscuring the reflection of the auxiliary blindzone viewing mirror in the main viewing mirror. Moreover, the lip can be integrally formed within the auxiliary blindzone viewing mirror, or rather, the lip can be integrally formed within a wall formed in the case.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

FIG. 5 is a perspective drawing showing how a less than unit magnification mirror can be placed on the driver's outside mirror to avoid conflicting with the requirements of FMVSS 111 and yet provide a wide angle mirror to observe the blindzone;

FIG. 6 is a front view of the mirror of FIG. 5;

FIG. 7 is side sectional view of the mirror of FIG. 6 in the plane along line 7-7 in the direction of the arrows showing the proper location of the center of the sphere on which the surface of the blindzone mirror lies, so as to produce vertical centering of the image of a vehicle that is in the blindzone;

FIG. 8 is a top sectional view of the mirror of FIG. 6 in the plane along line 8-8 looking in the direction of the arrows showing the proper location of the center of the sphere on which the surface of the blindzone mirror lies, so as to produce horizontal centering of the image of a vehicle that is in the blindzone;

FIG. 20 is a plan view of an automotive outside rearview mirror assembly according to another embodiment of the present invention;

FIG. 21 is a sectional view of the mirror assembly in FIG. 20 taken along line 21-21;

FIG. 22 is a sectional view of the mirror assembly in FIG. 20 taken along line 22-22;

FIG. 23 is a plan view of an automotive outside rearview mirror assembly according to another embodiment of the present invention;

FIG. 24 is a sectional view of the mirror assembly in FIG. 23 taken along line 24-24;

FIG. 25 is a sectional view of the mirror assembly in FIG. 23 taken along line 25-25;

DETAILED DESCRIPTION OF THE PREFERRED EMBODIMENT(S)

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
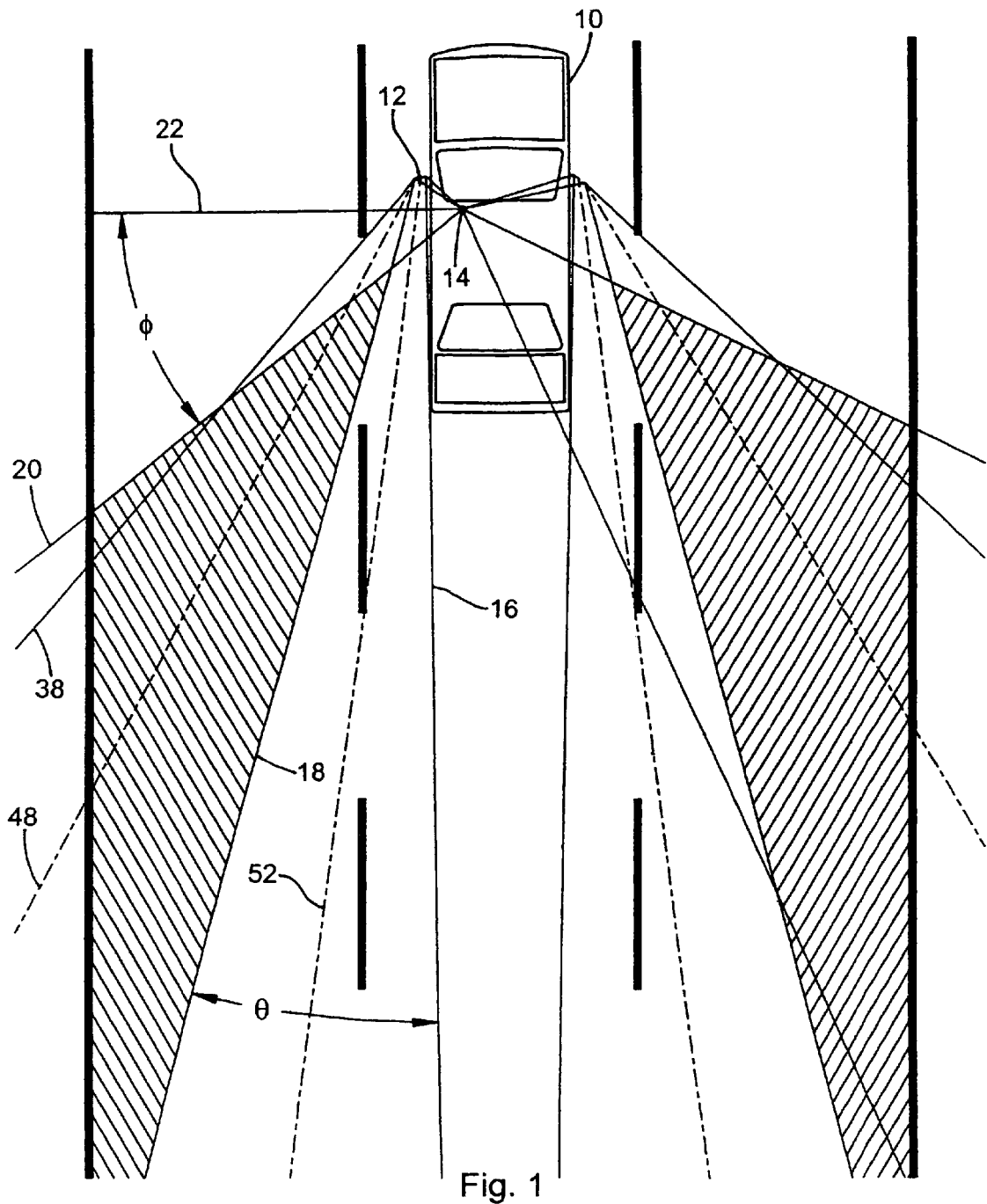
FIG. 1 is a plan view of an automobile on a three-lane highway depicting the field of view of the automobile's outside mirrors and the blindzones.

Referring now in greater detail to the drawings, FIG. 1 shows a mid-sized passenger car 10 in the middle lane of a three-lane highway with 12-foot wide lanes. The vehicle 10 is equipped with a driver's side outside mirror 12. The driver's eyes are shown centered at point 14, from which the driver has a field of view to the rear in the horizontal plane encompassing the acute angle formed by lines 16 and 18. Line 20 defines the rearward limit of the driver's peripheral vision when looking at mirror 12. Thus, the area bounded by lines 18 and 20 is a blindzone, shown crosshatched, which cannot be observed in either the driver's direct forward vision or indirectly in the mirror.

SAE Technical Paper 950601 describes the horizontal field of view of a plane mirror in a mathematical equation as a function of the mirror's dimensions and the position of the eyes relative to the mirror. Typically, the angle θ subtended by lines 16 and 18 is in the order of 15° to 20°. Angle θ is given by Eq. 1, and it is, $$\theta = 2\tan^{-1}\left[\frac{w\cos\lambda + D}{2\sqrt{s_L^2 + s_T^2}}\right], \quad \text{Eq. 1}$$

where:
w=mirror width;
D=interpupillary distance;
$S_L$=the longitudinal distance along the axis of the vehicle from the driver's eyes to the center of the mirror;
$S_T$=the transverse distance perpendicular to the longitudinal axis from the driver's eyes to the center of the mirror; and
$\lambda = \frac{1}{2}\tan^{-1}(S_T/S_L)$ As described in SAE Technical Paper 950601, the peripheral vision line 20 cannot be precisely located. It depends on the location of the drivers' eyes relative to the mirror 12 and several other factors. For example, Burg (Journal of Applied Psychology/Vol. 5/No. 12/1968) has shown that the angular extent of peripheral vision is a function of age. At age 20 it extends 88° from straight-ahead to the side. At 70 years, this angle has dropped to 75°. Angle φ in FIG. 1 is the angle of the peripheral vision line 20 relative to line 22, which is perpendicular to the longitudinal axis of vehicle 10. Typically this angle will be in the range of 40 degrees.

Figure 2:
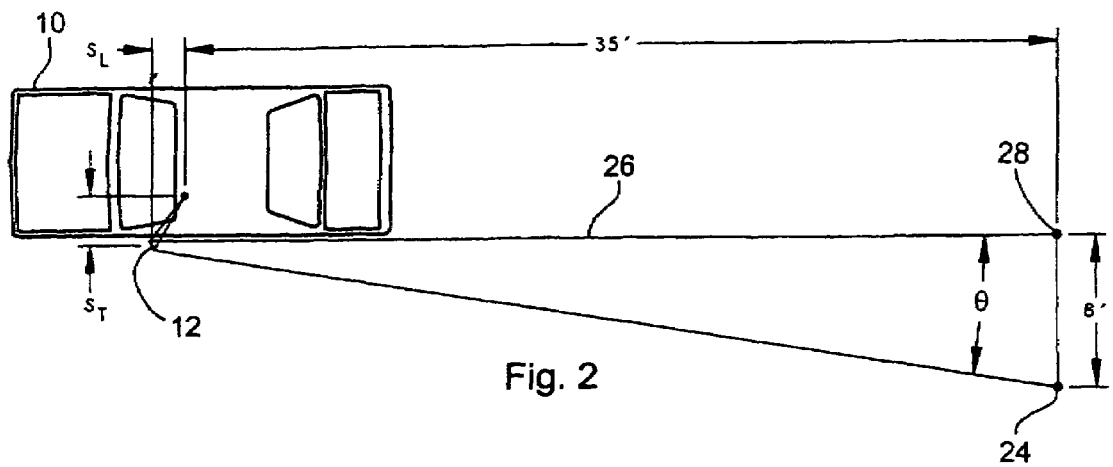
FIG. 2 is a diagram showing the requirements of FMVSS 111 for the horizontal field of view of the driver's outside mirror.

FIG. 2 shows the requirement imposed on the width of mirror 12 by FMVSS 111. As previously stated, the mirror 12 must be able to show a point, as 24, which is 244 cm (8 feet) out from a plane 26 tangent to the side of the vehicle and 1067 cm (35 feet) behind the driver's eyes with the seat in the rear most position. Point 28 is 1067 cm behind the driver's eyes and in plane 26. Points 24 and 28 are on the road surface. Angle θ in FIG. 2 is obviously, $$\theta = \tan^{-1}\left(\frac{244}{S_L + 1067}\right). \quad \text{Eq. 2}$$

Angle θ has a value of about 11.5° for almost any passenger car, and the variation in θ produced by variations in $S_L$ is a second order effect. Hence, the width of the mirror required by FMVSS 111 can be calculated by solving Equation 1 for w. Then, $$w = \frac{2\sqrt{s_L^2 + s_T^2}\left(\tan\frac{\theta}{2}\right) - D}{\cos\lambda}. \quad \text{Eq. 3}$$

Angle θ in this case is equal to 11.5°. Using values of $S_L$=45.7 cm, $S_T$=70 cm, and D=6.4 cm, w is found to be 9.4 cm. This value can vary significantly among vehicles, since in Eq. 3, $S_L$ and $S_T$ variations no longer produce only second order effects as in Eq. 2. In practice, vehicle manufactures will specify mirror widths in excess of the FMVSS 111 requirements to further reduce the blindzone size.

Figure 3:
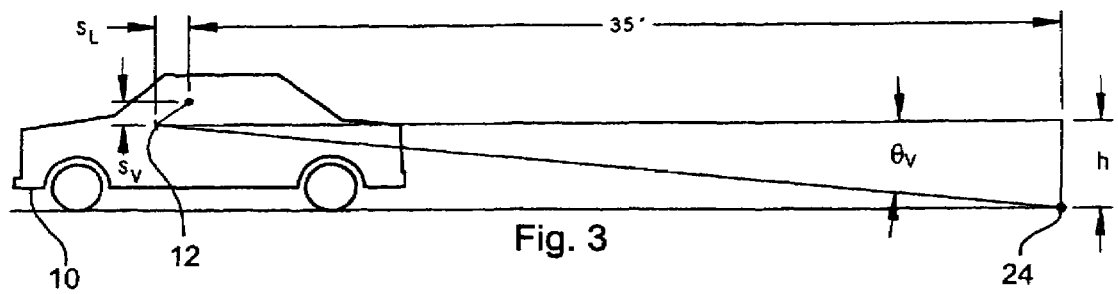
FIG. 3 is a diagram showing the requirements of FMVSS 111 for the vertical field of view of the driver's outside mirror.

FIG. 3 shows the requirements imposed on the vertical dimension of mirror 12 by FMVSS 111. In the vertical plane, vision is monocular since the eyes are not separated as they are in the horizontal plane. SAE Technical Paper 950601 shows that for monocular vision, the interpupillary distance D drops out of Equation 1, so that it becomes, $$\theta = 2\tan^{-1}\left[\frac{w\cos\lambda}{2\sqrt{s_L^2 + s_T^2}}\right]. \quad \text{Eq. 4}$$

Then, $$w = \frac{2\sqrt{S_L^2 + S_T^2}\tan\frac{\theta}{2}}{\cos\lambda}. \quad \text{Eq. 5}$$

In FIG. 3, h is the height in cm of mirror 12 above the ground, and it can vary significantly from a sports car to a sedan to a van. Angle $\theta_V$ is the angle that determines what the vertical dimension, $w_v$, of mirror 12 must be, in conjunction with the distance of the eye from the mirror. Angle $\theta_V$ replaces angle θ in Equation 5 when calculating the vertical dimension of the mirror. Applying Equation 5 to the required vertical dimension of the mirror, $w_v$, $$w_V = \frac{2\sqrt{S_L^2 + S_V^2}\tan\frac{\theta_V}{2}}{\cos\lambda_V}, \quad \text{Eq. 6}$$

where: $S_v$=vertical distance in the vertical plane from the eye to the mirror;
$\lambda_V = \frac{1}{2}\tan^{-1}(S_V/S_L)$; and $$\theta_V = \tan^{-1}\left(\frac{h}{S_V + 1067}\right).$$

Substituting measured values of h, $S_L$, and $S_V$ from one mid-size passenger car gave a value for $w_v$ of 6.4 cm.

The FMVSS 111 requirement for the vertical dimension of the mirror is only a minimum, and it does not provide a satisfactory mirror. Drivers usually set their mirrors so that if the car is on a straight and level road, the horizon will be in about the center of the mirror. This means that if point 24 is to be visible with the horizon centered, the mirror should be about 12.7 cm high. Most passenger car mirrors are not this large vertically, and are closer to 10.2 cm to 11.4 cm. However, the requirements of the standard are met.

Figure 4:
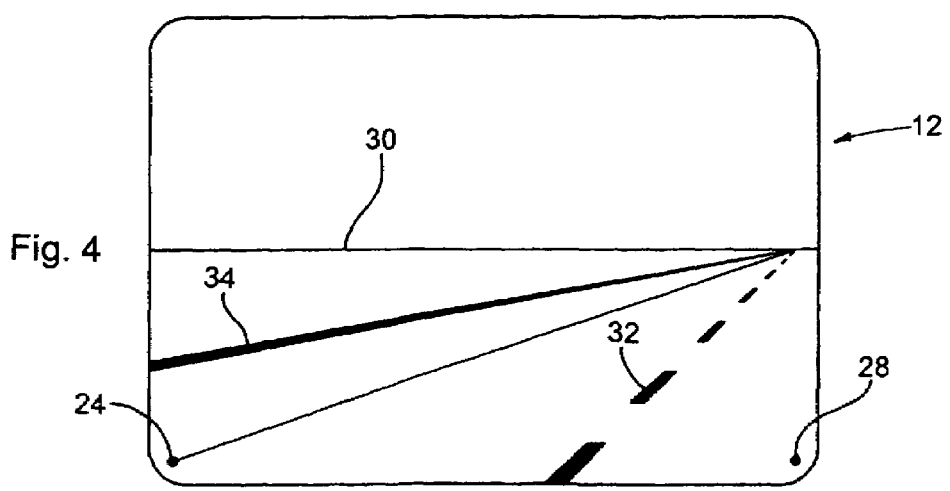
FIG. 4 is an image of the road as seen in the driver's outside mirror showing the effect of the requirements of FMVSS 111 on the horizontal width and the vertical height of the mirror.

FIG. 4 shows mirror 12 adjusted so that the horizon 30 lies at its center. Point 24 is shown in the lower left-hand corner. Also shown is point 28 in the right-hand corner. Line 32 represents the dashed yellow lane marker between the two left lanes. Line 34 represents the left edge of the left lane. Lines 32 and 34 converge at infinity on the horizon. The mirror has been adjusted so that point 28 is just visible, i.e. rotating the mirror farther outward would make point 28 disappear from view.

As previously mentioned, a mirror constructed to just meet the requirement in its horizontal field of view would have an excessively large blindzone. This could be remedied by providing an auxiliary blindzone-viewing mirror of less than unit magnification with a wide field of view, located such that it does not interfere with line 34. Such an auxiliary mirror 36 is shown in FIG. 5 attached to a plane main viewing mirror 40. Mirror 36 is a spherically convex mirror having dimensions and an orientation such that its field of view encompasses the region in FIG. 1 between lines 18 and 38. Mirror 36 can be made small enough so that is does not excessively encroach on the plane area of the main viewing mirror 40 above line 34. For example, if mirror 40 is 10 cm wide, mirror 36 could easily be 4.4×4.4 cm square. Using 4.4 cm as the horizontal dimension for mirror 36, the radius of curvature required to encompass the blindzone can be calculated from another equation in SAE Technical Paper 950601. There it is shown that the field of view of a convex mirror is, $$\theta = 2\left[2\tan^{-1}\frac{w}{2r} + \tan^{-1}\frac{w\cos\lambda + D}{2\sqrt{s_L^2 + s_T^2}}\right]. \qquad \text{Eq. 7}$$

All of the variables in Equation 7 are the same as Equation 1 except for r, which is the radius of curvature of the convex mirror. Angle θ in Equation 7 is to be taken as the angle between lines 18 and 38 in FIG. 1. Line 38 is seen to extend from mirror 12 and intersect the peripheral vision line 20 in the center of the adjacent lane. The angle between lines 18 and 38 is about 25°. Using w=4.5 cm, $S_L$=45.7 cm, $S_T$=26.5 cm and D=6.4 cm, r calculates out to be 27.8 cm. Selection of 25° as the blindzone width is partially subjective. It involves the choice of the peripheral vision angle, the positioning of the mirror and an estimate of how much of the geometrically defined blindzone must be included to assure that a driver is able to see a vehicle in the blindzone. In general a radius of curvature in the range of 20 cm to 35 cm will be satisfactory depending upon the vehicle.

A key factor in the shaping and positioning of the blindzone-viewing mirror is the required location of the center of the sphere from which the segment is taken. A vehicle in the blindzone should appear centered in the auxiliary blindzone-viewing mirror. FIGS. 6, 7 and 8 comprise a geometric orthographic projection showing the proper orientation of a spherically convex mirror segment 36 relative to a plane mirror 40. A radius 42 and an arc 44 of the sphere from which segment 36 is taken, must pass through the center 46 of the face of segment 36. The location of the center of the sphere must be specified so that centering of the image of a vehicle in the blindzone will occur.

As previously stated, most drivers adjust their mirrors so that if they were on a straight and level road, the horizon would be approximately centered in the mirror. Vertical centering of an image in the blindzone-viewing mirror 36 then requires that the image of the horizon pass through center 46 of mirror 36. This simply requires that radius 42 lie in a plane perpendicular to plane mirror 40, and that the plane also pass through center point 46, as shown in FIG. 7.

Horizontal centering of the view of the blindzone in mirror 36 requires that radius 42 be located such that it passes through center 46 of mirror 36 and also falls along line 48 in FIG. 1 which bisects the acute angle formed by lines 18 and 38. The actual position of radius line 42 in FIG. 8 relative to the vehicle is dependent upon how the driver has positioned the mirror relative to the vehicle. However, the position of line 42 relative to line 50 in FIG. 8 is constant. If the driver is instructed to position the plane mirror so that the side of the car is just visible, the position of line 42 is then effectively constant relative to the side of the vehicle, and the blindzone view is effectively centered about line 48 in FIG. 1.

The field of view in the plane main viewing mirror is θ degrees wide as shown in FIG. 1. If the driver so chooses, he or she could readjust the main viewing mirror so angle θ straddles line 48. Then, the plane mirror view would be centered on the blindzone. Many drivers actually set their mirrors this way to view the blindzone. Since the angle of reflection is equal to the angle of incidence, rotating the field of view outward by say 30°, would require rotating the mirror outward by 15°. Hence, to make the plane mirror look into the center of the blindzone requires that it be rotated by ½ of the angle between line 48 and line 52, where line 52 bisects angle θ. Again selecting the blindzone width as 25°, and using a value of 15° for θ, the field of view would have to be rotated ½ (25°+15°)=20°. This would require rotating the mirror 10° to look into the center of the blindzone with the plane mirror.

The same reasoning applies to the convex blindzone-viewing mirror. If radius 42 were perpendicular to the surface of plane mirror 40, the field of view of the convex mirror would be centered about line 52 in FIG. 1. But we want the spherical mirror's field of view to be centered about line 48 when the plane mirror is adjusted to just see the side of the vehicle. Therefore in FIG. 8, line 42 should be at an angle β of 10° to line 50. The exact angle β chosen will be dependent upon the vehicle and the assumptions made for the position of line 48 in FIG. 1.

Figure 9:
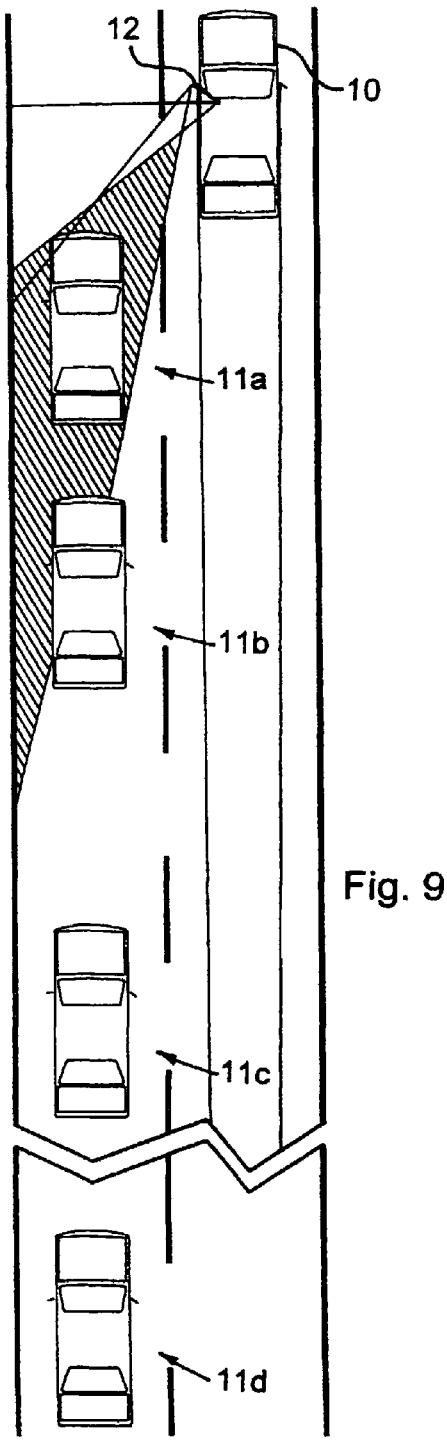
FIG. 9 is a plan view of a two lane highway showing a vehicle in the right lane equipped with the mirror of FIG. 5 and four positions of an overtaking vehicle in the left lane.
Figure 10A:
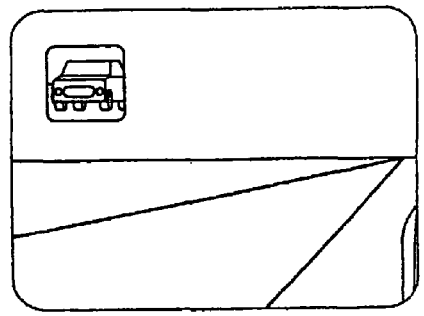
FIG. 10a shows the image of an overtaking vehicle in FIG. 9, in a mirror like that of FIG. 5.
Figure 10B:
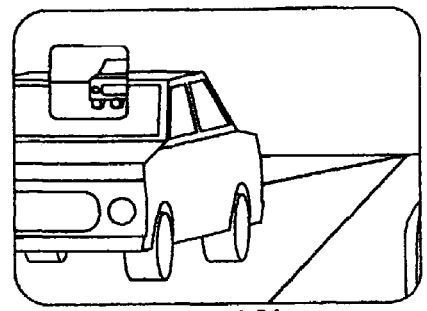
FIG. 10b is like FIG. 10a except that the overtaking vehicle is farther to the rear.
Figure 10C:
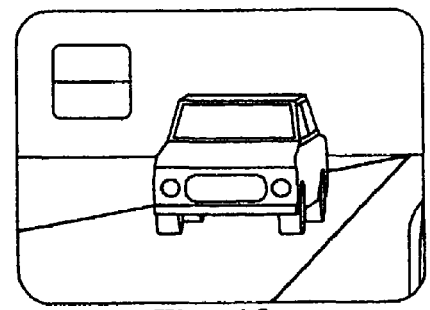
FIG. 10c is like FIG. 10b except that the overtaking vehicle is farther to the rear.
Figure 10D:
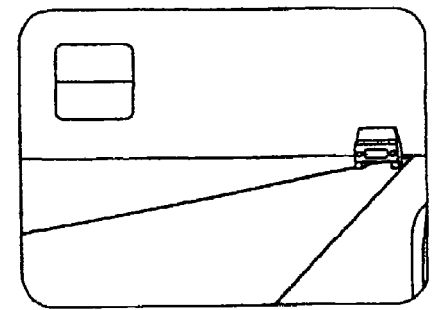
FIG. 10d is like FIG. 10c except that the overtaking vehicle is farther to the rear.

The criteria required to size, place and orient the less than unit magnification auxiliary blindzone-viewing mirror have now been established. Using these criteria will provide a mirror which conforms with FMVSS 111, centers the image of a vehicle in the blindzone in the less than unit magnification mirror, and optimizes the image size for the space allocated to the less than unit magnification mirror. Mirror 36 in FIG. 5 may be visualized as a spherically convex bulls eye mirror wherein all extraneous portions of the bulls eye have been removed, leaving only that portion which will show a vehicle in the blindzone. When driving with a mirror so configured, a vehicle overtaking on the driver's side will be seen in the main viewing mirror when the vehicle is to the rear of the blindzone. As the vehicle approaches, it appears to slide outwardly off of main viewing mirror 40 and onto blindzone-viewing mirror 36. FIG. 9 shows an overtaking vehicle at various distances behind vehicle 10 of FIG. 1. FIGS. 10a, 10b, 10c and 10d show the position of the image of the overtaking vehicle on mirror 12 in FIG. 9. FIG. 10d shows the image of the overtaking vehicle at a position 11*d* in FIG. 9 about 12 car lengths to the rear of vehicle 10. Note that a small portion of the left rear fender of vehicle 10 is seen in the lower right-hand corner of the plane main mirror. FIG. 10*c* shows the image of the vehicle at a position 11*c* about 3.5 car lengths to the rear. FIG. 10*b* shows the image of the vehicle at position 11*b* about 1.25 car length back, and it is seen mostly in the plane main viewing portion of the mirror, but partially in the auxiliary blindzone-viewing portion. FIG. 10*a* shows the image of the overtaking vehicle in position 11*a*, which is entirely in the blindzone, and it is seen that the image is entirely in the blindzone-viewing mirror. Thus, the image of the approaching vehicle moves from inside to outside across the mirror, and this is one reason why the auxiliary mirror is placed in the upper and outer quadrant of the rearview mirror. Placing it on the inner quadrant would disturb the apparent flow of the image of the overtaking vehicle as it moves across the main mirror from inside to outside.

Figure 11:
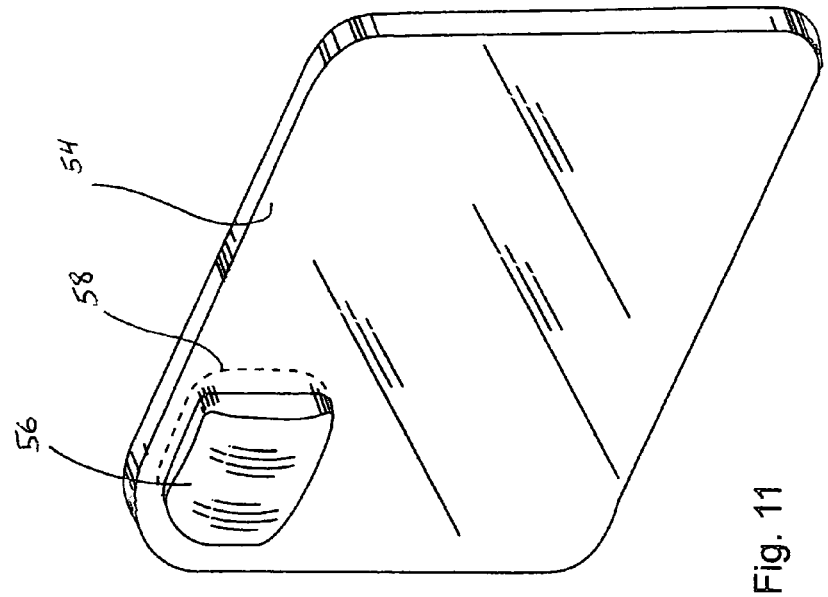
FIG. 11 is a perspective view of an auxiliary blindzone viewing mirror having straight edges depicting how the reflection of the auxiliary blindzone viewing mirror can be seen in the main viewing mirror obscuring the driver's perception.

Next, various ways of implementing the combination of the main viewing mirror and the blindzone-viewing mirror will be shown. One simple way is to adhere a glass or plastic segment of a spherically convex mirror to the plane mirror, as shown in FIG. 5. However, the spherically convex stick-on mirror shown in FIG. 5 is not without some crude and undesirable features. For example, one such feature is that the sides of the stick-on mirror are straight. As such, the sides are reflected in the plane mirror, which the stick-on mirror is mounted upon, appearing to double the height of the stick-on mirror. FIG. 11 shows a plane mirror 54 with a stick-on mirror 56 having straight sides. A reflection 58 of the top edge of stick-on mirror 56 in plane mirror 54 is depicted by a dashed reference line. The reflection 58 is plane mirror 54 can be both distracting and unattractive.

Figure 12:
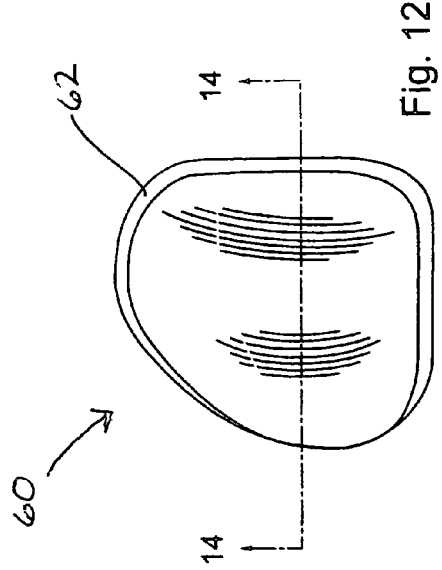
FIG. 12 is a plan view of an auxiliary blindzone viewing mirror according to an embodiment of the present invention.
Figure 13:
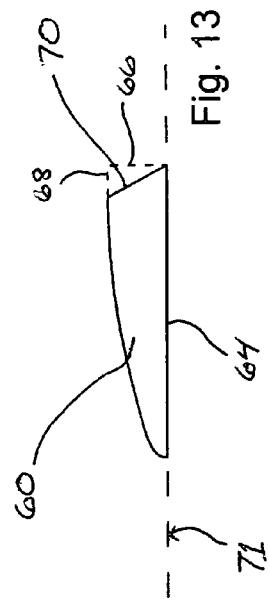
FIG. 13 is side view of the auxiliary blindzone viewing mirror shown in FIG. 12.

FIGS. 12 and 13 show a stick-on auxiliary blindzone viewing mirror 60, according to an embodiment of the presentation, having a skirt 62 around its perimeter. The skirt 62 can have canted or flared sides to hide the reflection of stick-on mirror 60 in a plane mirror. Preferably, the skirt extends outward along its base by an amount of about one half of the height of mirror 60 above its base 64 as indicated by dashed lines 66 and 68. Surface 70 may be flat or curved. Also, if mirror 60 is a single piece injection molded plastic with a reflective coating applied to it, surface 70 preferably has a matte finish to avoid reflections from that surface.

Another advantage of the skirt 62 is that it helps to blend the auxiliary mirror 60 into a planar main viewing mirror making it appear a more integral part of the main mirror. This is especially true if the base 64 can be made flush with the main mirror. However, it is important to note that adhering the stick-on auxiliary mirror 60 to the main mirror with a thin film of an adhesive having a high modulus of elasticity may be undesirable. For instance, the difference in thermal expansion between the auxiliary mirror 60 and the typical glass main mirror, along with the rigidity of the bond, may cause warping and distortion of an image in the main mirror. The image distortion is generally observable when the ambient temperature is 20° F. or more away from the bonding temperature.

Figure 14:
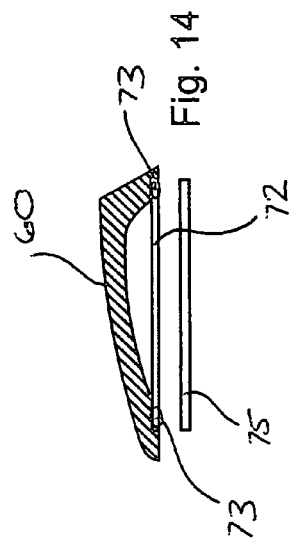
FIG. 14 is a sectional view of the auxiliary blindzone viewing mirror shown in FIG. 12 taken along the line 14-14.

To achieve a close fit between the auxiliary mirror 60 and a main mirror surface 71 and to avoid distortion, a shallow ledge 72 can be provided in the base 64 of the auxiliary mirror 60, as shown in FIG. 14. Ledge 72 can be located inboard of the bottom perimeter of auxiliary mirror 60 by about 2 or 3 millimeters. Further, edge 72 can be about 1 millimeter deep. A bead of adhesive 73 such as Dymax 4-20533, which has a low modulus of elasticity and sets to a rubbery consistency, can be applied along the ledge 72. Auxiliary mirror 60 can now be pressed flat against the main mirror surface 71. Accordingly, the adhesive 73 fills ledge 72 while the excess adhesive flows into a cavity 74. Cavity 74 can retain the excess adhesive while reducing part weight and the material necessary to form auxiliary mirror 60. The adhesive 73 in the ledge 72 can now hold auxiliary mirror 60 firmly in place while absorbing any differences in thermal expansion. It is fully contemplated that any typical adhesive with a low modulus of elasticity can be used. Moreover, it may be desirable to use an adhesive capable of being cured with ultraviolet light.

Alternately, a double sided adhesive pad 75 may be used to affix auxiliary mirror 60 to the main mirror surface 71. The ledge 72 can be utilized to retain the pad 75. Thus, the pad 75 can be die cut to fit the ledge 72. Moreover, the depth of the ledge 72 and the thickness of the pad 75 can be sized to produce the minimum protrusion of the pad 75 below the base 64 of auxiliary mirror 60 that will still provide adequate adhesion to the main mirror surface 71. The width of ledge 72 can be extended inward when using the double sided adhesive pad 75 to increase the adhered area. Furthermore, the lightening volume defined by cavity 74 may be eliminated. Accordingly, the adhesive pad 75 may be a desirable alternative for aftermarket applications.

Yet another advantage of the skirt 62 on auxiliary mirror 60 is that the canted or flared surface 70 can act as a deflector of impact loads, such as that produced by an ice scraper. The skirt 62 tends to deflect the scraper away from the auxiliary mirror 60, thereby minimizing the likelihood of dislodging the auxiliary mirror 60 from the main mirror surface 71.

Referring back to FIG. 8, the convex surface of a blindzone-viewing auxiliary mirror attached to a planar main mirror will vary in height above the surface of the planar main mirror. The right edge of stick-on mirror 36 is shown to be higher above the surface of main mirror 40 than the left edge. A blindzone viewing mirror having a viewing angle of 25° and a base having dimensions of 50 mm×50 mm, for example, may have a height of about 6 mm at the right edge. This height rolls off to about 1 mm at the left edge. In some instances, it may be desirable to improve the appearance of the combined mirrors by recessing the auxiliary mirror partially below the surface of the main mirror. A semi-recessed auxiliary blindzone mirror can be esthetically more pleasing than one that is fully recessed.

Figure 15:
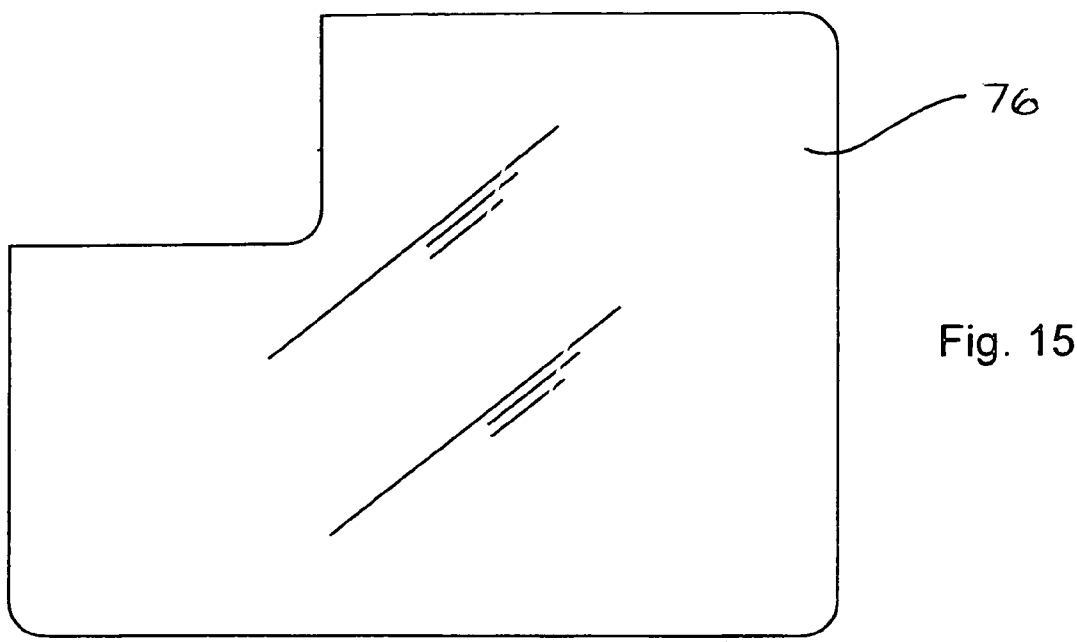
FIG. 15 is a plan view of a main viewing mirror according to an embodiment of the present invention.
Figure 16:
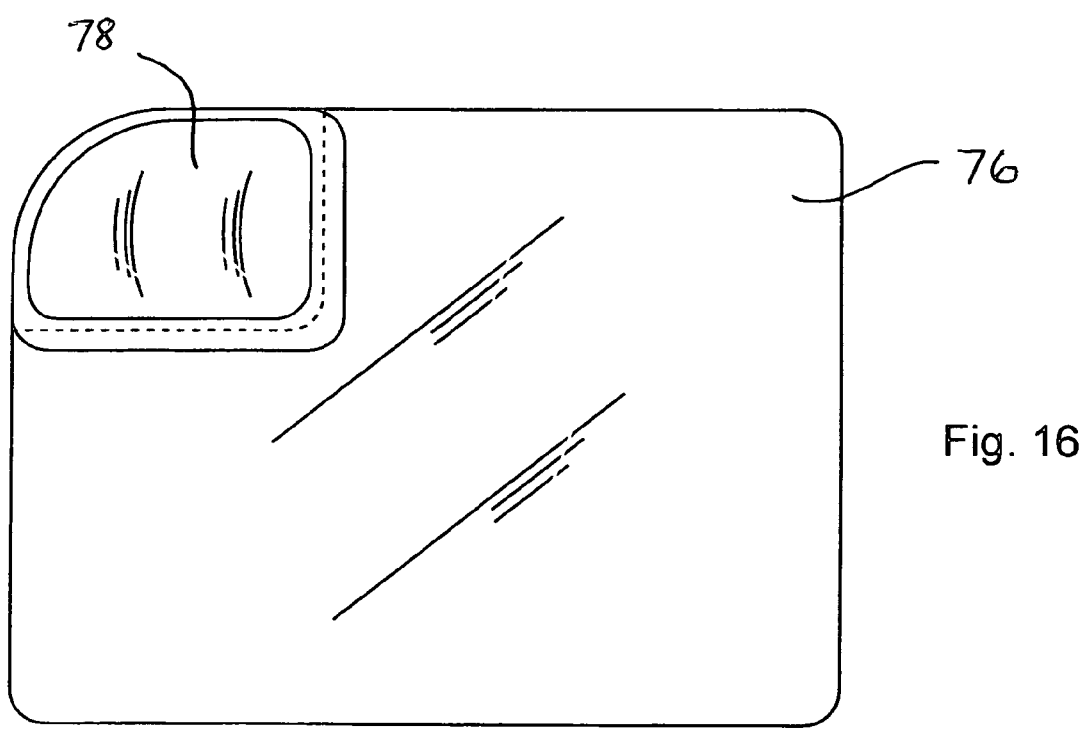
FIG. 16 is a plan view of an automotive outside rearview mirror assembly having an auxiliary blindzone viewing mirror according to an embodiment of the present invention.
Figure 17:
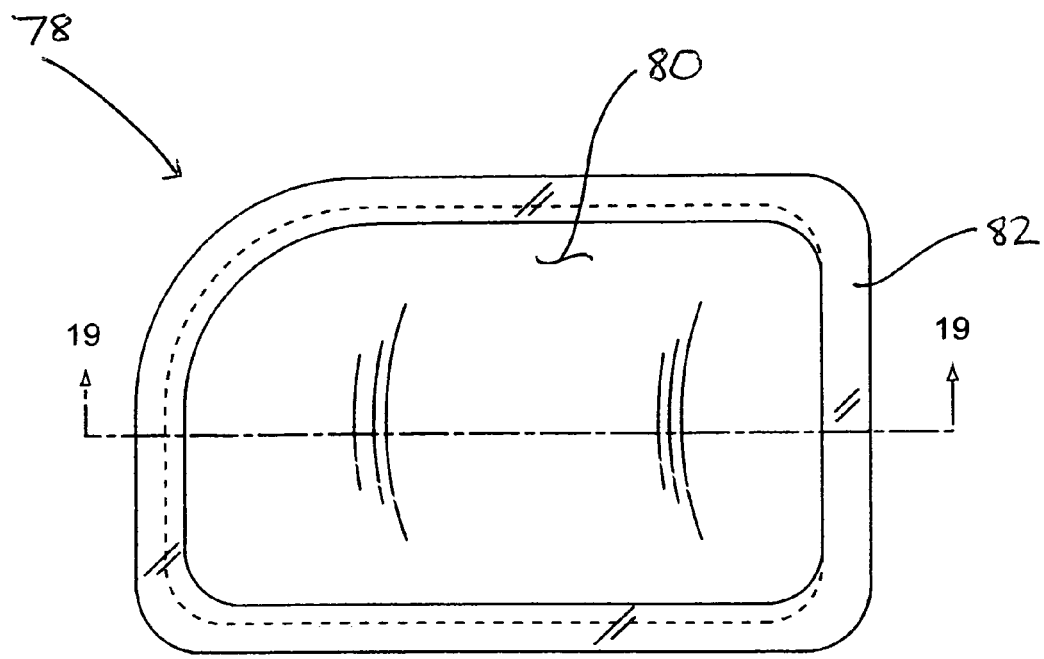
FIG. 17 is an enlarged plan view of the auxiliary blindzone viewing mirror shown in the upper and outer quadrant of the automotive outside rearview mirror assembly in FIG. 16.
Figure 18:
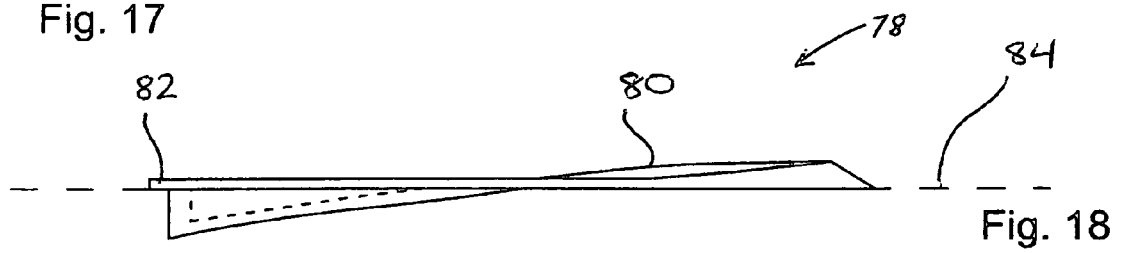
FIG. 18 is an elevational view of the auxiliary blindzone viewing mirror shown in FIG. 17.
Figure 19:
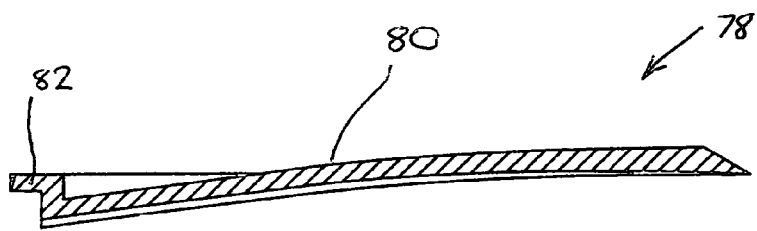
FIG. 19 is a sectional view of the auxiliary blindzone viewing mirror shown in FIG. 17 taken along line 19-19.
Figure 26:
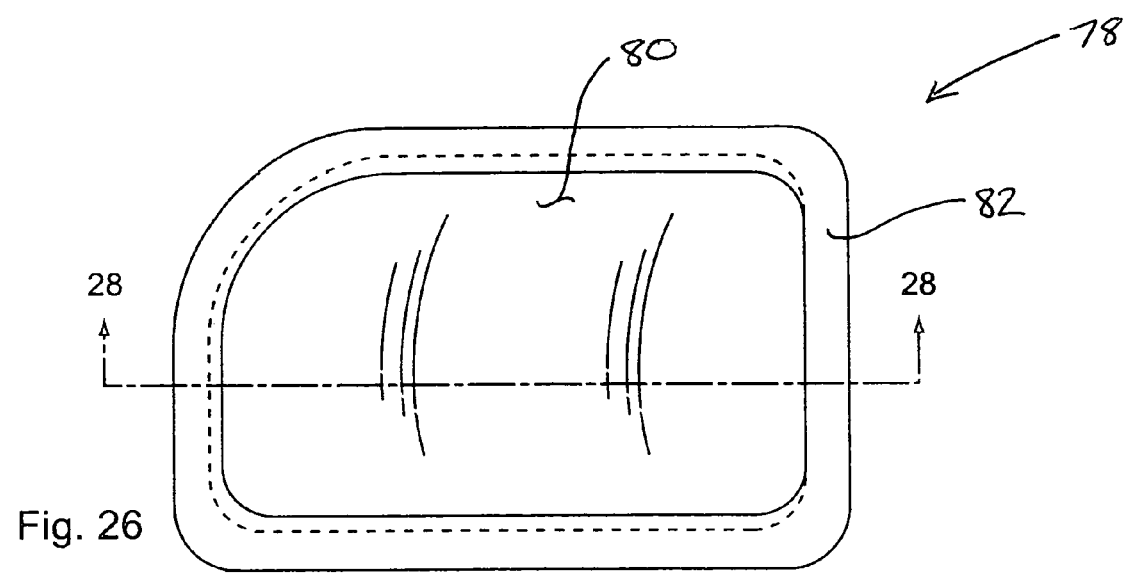
FIG. 26 is an enlarged plan view of a fully recessed auxiliary blindzone viewing mirror similar to the auxiliary mirror shown in the upper and outer quadrant of the automotive outside rearview mirror assembly in FIG. 16.
Figure 27:
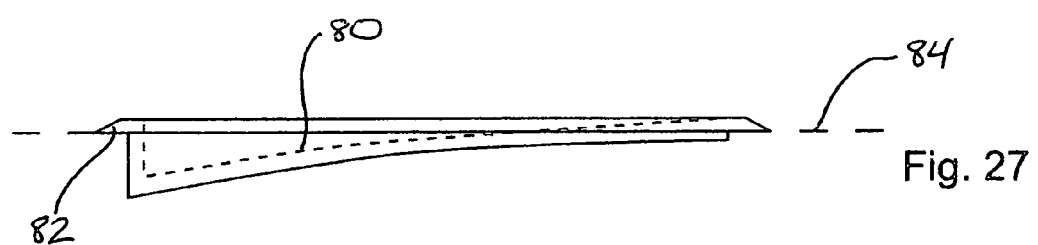
FIG. 27 is an elevational view of the auxiliary blindzone viewing mirror shown in FIG. 26.
Figure 28:
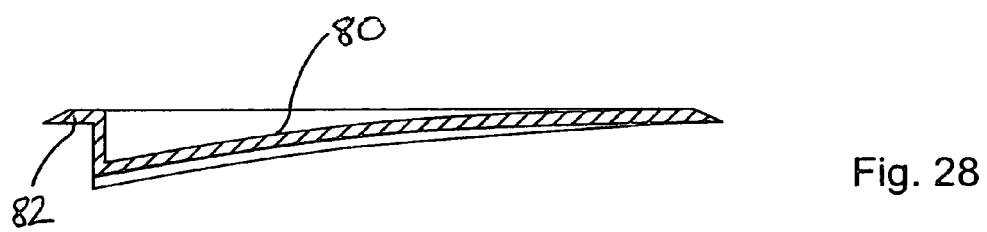
FIG. 28 is a sectional view of the auxiliary blindzone viewing mirror shown in FIG. 26 taken along line 28-28.

With reference now to FIGS. 15-19, an automotive outside rearview mirror assembly 77 according to an embodiment of the present invention is shown. The glass in a particular area of a planar main mirror 76 in which a blindzone viewing auxiliary mirror shall be mounted can be cut out. For example, the glass in the upper and outer quadrant of main mirror 76 can be removed, as illustrated by FIG. 15. FIG. 16 shows an auxiliary blindzone mirror 78 inserted into the cut-out region of main mirror 76. The auxiliary mirror 78 is shown in greater detail in FIGS. 17, 18, and 19. The auxiliary mirror 78 can be a convex mirror designed to be semi-recessed below the plane of the surface 84 of main mirror 76. For example, approximately half of convex surface 80 lies below surface 84, while the remainder of convex surface 80 lies above surface 84. Of course, it is fully contemplated that the auxiliary mirror 78 can be fully recessed such that the convex surface 80 lies on or below the plane of surface 84 of main mirror 76 (as shown in FIGS. 26-28. Auxiliary mirror 78 is preferably injection molded. However, other methods known in the art for manufacturing auxiliary mirror 78 can be employed without departing from the scope of the present invention. A reflective coating 81 is then applied to surface 80. A rim 82 can be formed around the convex surface 80 to engage the surface 84 of main mirror 76. An adhesive may be used to attach rim 82 to main mirror 76. FIG. 19 is a sectional view taken along line 19-19 of FIG. 17 showing more clearly the contour of the convex mirror surface 80 above and below the plane of the surface 84 of the main mirror 76. Again, a skirt 83 (best shown in FIGS. 18 and 19), can be formed on the rim 82 to avoid undesirable reflections of the auxiliary mirror 78 in the main mirror 76. Moreover, a recessed ledge 85 can also be used for adhering auxiliary mirror 78 to main mirror 76.

Rim 82 is depicted in FIG. 17 as having the same width around the perimeter of convex surface 80. In practice, the width of rim 82 can vary at different segments around the perimeter of auxiliary mirror 78. The width of rim 82 can be especially dependent on the position of auxiliary mirror 78 upon the surface 84 of the main mirror 76. The rim 82, for example, may be very narrow at the outer edge, as shown in FIG. 16.

Generally, outside rearview glass main mirrors are held in a thin injection molded plastic case. The case is used to cover and protect the edges of the glass. The back surface of the case provides an attachment member for connecting the mirror to the case. The attachment member is typically coupled to a positioning mechanism used to move the plane of the mirror about a central pivot point for positioning the view seen by the driver. Typically, the case will have slots which are used to engage tangs on the surface of a pivoting plate which is supported on a central pivot point. The plate can be pivoted by electric motors or cables. The mirror assembly 77 of FIG. 16 can be held in such a case. However, a depression in the case may be required to accommodate the auxiliary blindzone mirror 78.

Referring to FIGS. 20-22, an automotive outside rearview mirror assembly 86 according to an embodiment of the present invention is illustrated. The mirror assembly 86 is generally comprised of a glass main mirror 88 and a convex auxiliary blindzone viewing mirror 90 mounted in a case 92. Auxiliary mirror 90 can differ from the auxiliary mirror 78 of FIG. 16 by not requiring a rim surrounding the entire perimeter of the auxiliary mirror. Rather, a lip 98 can be formed along the inboard edges of auxiliary mirror 90 for extending out over main mirror 88. Auxiliary mirror 90 can have a spherically convex surface 93, which starts at a high point 94 and rolls off to a low point 96 (best shown in FIG. 21). A back surface 100 of auxiliary mirror 90 can follow a curved surface which begins at a point 102 and rolls off to a point 104. The distance between point 96 and 104 can be about 1 mm. The case 92 follows the contour of back surface 100. Auxiliary mirror 90 may be held in place by an adhesive between lip 98 and main mirror 88. Moreover, an adhesive between back surface 100 and the case 92 may be employed to secure auxiliary mirror 90. As shown in FIG. 22, a wall 106 can be formed which supports the lip 98 in the general region between points 108 and 110 (shown in FIG. 20). Point 108 refers to the general location just before convex surface 93 drops below the first surface of main mirror 88.

FIGS. 23, 24, and 25 depict yet another embodiment of a semi-recessed auxiliary blindzone mirror, in accordance with the teachings of the present invention. FIG. 23 shows an automotive outside rearview mirror assembly 112 incorporating a planar main mirror 114, a blindzone viewing auxiliary mirror 116, and a case 118. Mirror assembly 112 differs from previous embodiments in that a skirt 119 required to eliminate the undesirable reflections of auxiliary mirror 116 in main mirror 114 can be provided by the case 118. A wall 120 having a canted top forming skirt 119 can be molded into case 118 running entirely along the cut-out section of the glass. The glass in this region is indicated by the hidden edge line 122. Auxiliary mirror 116 can be a spherically convex plate, which may be injection molded plastic or glass. The auxiliary mirror is preferably a first surface mirror. Further, the surface 121 of case 118 behind auxiliary mirror 116 can have a similar surface contour as the back surface 123 of auxiliary mirror 116. Accordingly, auxiliary mirror 116 can be adhered to the case 118 by an adhesive applied between the back surface 123 of the auxiliary mirror 116 and the surface 121 of the case 118.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An auxiliary blindzone viewing mirror for attachment to a main viewing mirror having a generally planar surface, the auxiliary blindzone viewing mirror comprising:
   a discrete mirror body defining a segment of a convex mirror having a reflective surface, the convex mirror having a radius of curvature and a magnification less than that of the main viewing mirror, the discrete mirror body being shaped and positioned for viewing primarily only a driver's blindzone encompassing the region between the outer limit of the viewing angle of the main viewing mirror and the rearward limit of the driver's peripheral vision when the driver is looking at the main viewing mirror, the discrete mirror body having a generally planar base for mating engagement with the generally planar surface of the main viewing mirror, the base having an outer peripheral edge and a recessed ledge formed inboard of the outer peripheral edges,
   wherein a bead of adhesive can be applied to the recessed ledge for adhesively attaching the blindzone viewing mirror to the main viewing mirror while permitting the base of the blindzone viewing mirror to mate flush with the planar surface of the main viewing mirror, and an interior cavity is formed inward of the recessed ledge for retaining excess adhesive which may flow from the recessed ledge.

2. The blindzone viewing mirror of claim 1, wherein the discrete mirror body is formed from injection molded plastic.

3. The blindzone viewing mirror of claim 1, wherein the adhesive has a generally low modulus of elasticity for absorbing differences in thermal expansion and avoiding stress that would produce distortion of images.

4. The blindzone viewing mirror of claim 1, further comprising a double-sided adhesive pad, the adhesive pad being retained in the recessed ledge of the blindzone viewing mirror, the thickness of the pad being sized to produce the minimum protrusion of the pad below the base sufficient to provide adequate adhesion of the blindzone viewing mirror to the main viewing mirror.

5. An automotive outside rearview mirror assembly comprising:
   a main viewing mirror having a generally planar reflective surface;
   a blindzone viewing mirror having a discrete mirror body adhesively attached to the main viewing mirror, the discrete mirror body defining a segment of a convex mirror having a reflective surface, the convex mirror having a radius of curvature and a magnification less than that of the main viewing mirror, the discrete mirror body being shaped and positioned for viewing primarily only a driver's blindzone encompassing the region between the outer limit of the viewing angle of the main viewing mirror and the rearward limit of the driver's peripheral vision when the driver is looking at the main viewing mirror, the discrete mirror body having a generally planar base for mating engagement with the generally planar surface of the main viewing mirror, the base having an outer peripheral edge and a recessed ledge formed inboard of the outer peripheral edge;

an adhesive member disposed along the recessed ledge between the blindzone viewing mirror and the main viewing mirror for retaining the blindzone viewing mirror to the main viewing; and an interior cavity formed inward of the recessed ledge for retaining excess adhesive which may flow from the adhesive member disposed along the recessed ledge.

6. The automotive outside rearview mirror assembly of claim 5, wherein the blindzone viewing mirror is located in the upper and outer quadrant of the main viewing mirror.

7. The automotive outside rearview mirror assembly of claim 5, wherein the blindzone viewing mirror is comprised of injection molded plastic.

8. The automotive outside rearview mirror assembly of claim 5, wherein the adhesive member comprises a bead of adhesive having a generally low modulus of elasticity.

9. The automotive outside rearview mirror assembly of claim 5, wherein the adhesive member comprises a double-sided adhesive pad, the adhesive pad being retained within the recessed ledge of the blindzone viewing mirror.

10. The automotive outside rearview mirror assembly of claim 9, wherein the thickness of the adhesive pad is sized to produce the minimum protrusion of the adhesive pad below the base sufficient to provide adequate adhesion of the blindzone viewing mirror to the main viewing mirror.

* * * * *